C. A. KLINE.
SIZING DEVICE FOR EYEGLASS RIMS.
APPLICATION FILED MAR. 20, 1919.
1,327,330.
Patented Jan. 6, 1920.
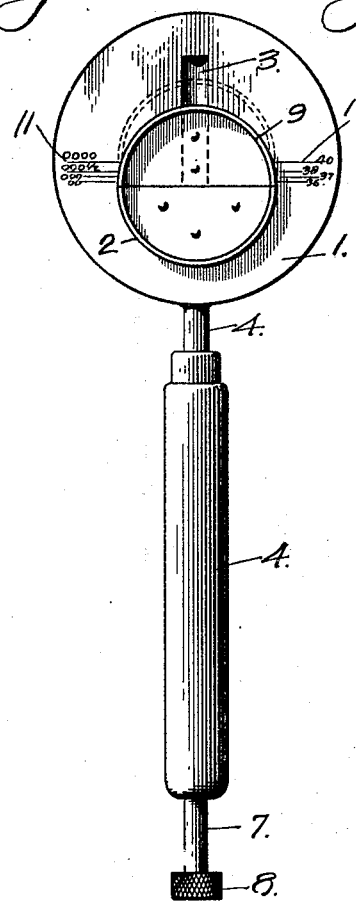
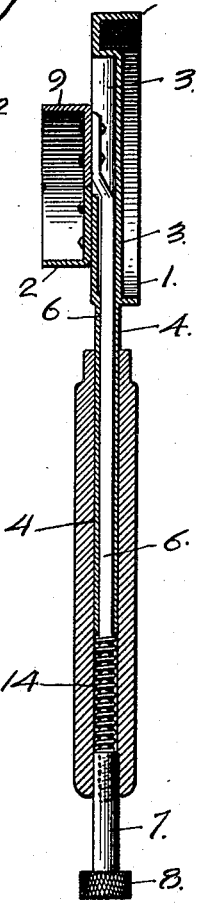
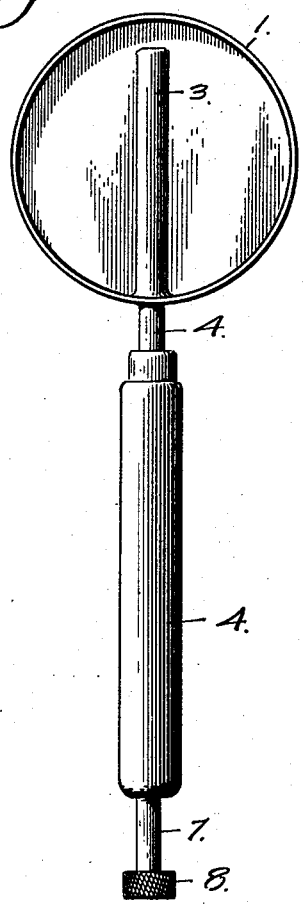
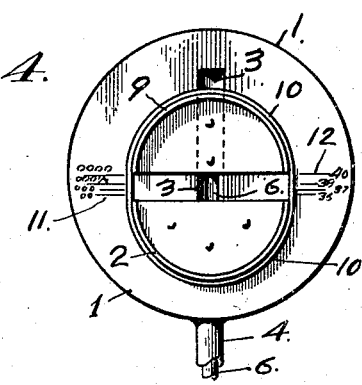

UNITED STATES PATENT OFFICE.

CLARENCE A. KLINE, OF SAN FRANCISCO, CALIFORNIA.

SIZING DEVICE FOR EYEGLASS-RIMS.

1,327,330.  Specification of Letters Patent.  Patented Jan. 6, 1920.

Application filed March 20, 1919. Serial No. 283,888.

*To all whom it may concern:*

Be it known that I, CLARENCE A. KLINE, a citizen of the United States, residing in the city and county of San Francisco and State of California, have invented a new and useful Improvement in Sizing Devices for Eyeglass-Rims, of which the following is a specification.

My invention relates to improvements in devices for sizing eye-glass rims, previously to mounting them, wherein a fixed and movable die operate in conjunction to expand or contract an eye-glass rim, previously rendered plastic by the application of heat, to the required size; and the objects of my invention are:

First, to provide an improved device for sizing eye-glass rims;

Second, to provide an improved device of the character described which shall be adapted to expand or contract eye-glass rims to the required size while in a plastic state.

I accomplish these several objects by means of the device disclosed in the drawings forming a part of the present specification wherein like characters of reference are used to designate similar parts throughout the said specification and drawings, and in which:

Figure 1 is a front elevation of my improved device;

Fig. 2 is a vertical sectional view;

Fig. 3 is a rear elevation; and

Fig. 4 is a detailed broken front elevation disclosing the manner in which a plastic eye-glass rim is enlarged.

Referring to the drawings the numeral 1 is used to designate what I term a heating pan, preferably circular in shape to the flat side of which is fixedly secured a semi-annular die 2.

The pan 1 is provided with a centrally disposed groove 3 which is extended beyond the periphery of the pan 1 in the form of a hollow handle 4, within which groove 3 and handle 4 is slidably mounted a plunger 6 terminating in an enlarged portion 7 provided on the end thereof with a suitable button 8.

A second semi-annular die 9 is secured to the inner end of the plunger 6 and is arranged to match with the fixed die 2 to form a circular hollow die to receive, internally or externally, an eye-glass rim 10.

Graduations 11, indicative of the trade size of the rims 10, are provided on the heating pan 1 on one side of the fixed die 2 while a second set of graduations 12, indicative of the distance in millimeters between the dies 2 and 9, are provided on the pan on the other side of the die 2.

A suitable spring 14 is interposed between the enlarged portion 7 of the plunger 6 and the handle 4 of the pan 1 and is arranged to normally retain the dies 2 and 9 in matching relation.

In operation an eye-glass rim 10 is placed upon the normally matching dies 2 and 9 and rendered plastic by the application of heat to the pan 1. When plastic the rim 10 may be easily and readily extended to the required size by operating the plunger 6, by means of the enlarged portion 7 and button 8 thereon, to separate the die 9 from the die 2 as disclosed in Fig. 4 of the drawing. The degree of separation of the adjacent edges of the dies 2 and 9, as indicated by the graduations 11 or 12, will indicate the size of the rim 10.

Should the rim 10 be larger than the required size it may be easily and readily contracted to the required size by first separating the dies 2 and 9 and placing the rim 10 inside of said semi-annular dies. When the rim has been rendered plastic through the application of heat to the pan 1, pressure on the plunger is released and the tension of the spring 14 will operate to close the dies 2 and 9 and thereby contract the plastic rim 10.

It is obvious from the foregoing that I have provided a new and useful improvement in a device for sizing eye-glass rims whereby said rims may be either increased or decreased to the required size.

The details of construction are so susceptible to variation that I do not wish to confine myself to the precise construction shown herein, but rather to avail myself of any modification that may fall properly within the scope of the appended claims.

Having thus described my invention, what I claim as new and desire to secure by Letters Patent is:

1. A sizing device for eye-glass rims comprising a heating pan; a hollow die secured to the heating pan; a second hollow die movably mounted upon the pan and matching with the first mentioned die, said matched dies being arranged to receive an eye-glass rim externally or internally; and means for moving the second mentioned die relatively to the first mentioned die to alter the size of an eye-glass rim rendered plastic by the application of heat to the heating pan.

2. A sizing device for eye-glass rims comprising a heating pan; a hollow die secured to the heating pan; a second hollow die movably mounted upon the pan and matching with the first mentioned die, said matched dies being arranged to receive an eye-glass rim externally or internally; means for moving the second mentioned die relatively to the first mentioned die to alter the size of an eye-glass rim rendered plastic by the application of heat to the heating pan; and means for indicating the size of the rim during the altering process.

3. A sizing device for eye-glass rims and the like comprising a hollow heating pan; a semi-annular die movably mounted upon the pan and normally matching with the first mentioned die to form an annular flange to receive, internally or externally, an eye-glass rim; and means for moving the movable die relatively to the fixed die to alter the shape of an eye-glass rim mounted within or upon the dies and rendered plastic by the application of heat to the pan.

4. A sizing device for eye-glass rims comprisng a hollow circular heating pan; a hollow handle secured to and extending radially from said pan; a semi-annular die fixedly secured to the pan; a second semi-annular die slidably mounted upon the pan and matching with the fixed die to form an annular hollow die to receive, internally or externally, an eye-glass rim; and a plunger secured to the movable die and extending through the handle on the pan whereby the movable die may be moved relatively to the fixed die to alter the size of an eye-glass rim on the dies and rendered plastic by the application of heat to the pan.

5. A sizing device for eye-glass rims and the like comprising a hollow heating pan; a semi-annular die fixedly secured to the pan; a second semi-annular die movably mounted upon the pan and normally matching with the first mentioned die to form an annular flange to receive, internally or externally, an eye-glass rim; means for moving the movable die relatively to the fixed die to alter the shape of an eye-glass rim mounted within or upon the dies and rendered plastic by the application of heat to the pan; and means for normally retaining the dies in matching relation.

6. A sizing device for eye-glass rims comprising a hollow circular heating pan; a hollow handle secured to and extending radially from said pan; a semi-annular die fixedly secured to the pan; a second semi-annular die slidably mounted upon the pan and matching with the fixed die to form an annular hollow die to receive, internally or externally, an eye-glass rim; a plunger secured to the movable die and extending through the handle on the pan whereby the movable die may be moved relatively to the fixed die to alter the size of an eye-glass rim on the dies and rendered plastic by the application of heat to the pan; and means for normally retaining the dies in matching relation.

7. A sizing device for eye-glass rims comprising a hollow circular heating pan; a hollow handle secured to and extending radially from said pan; a semi-annular die fixedly secured to the pan; a second semi-annular die slidably mounted upon the pan and matching with the fixed die to form an annular hollow die to receive, internally or externally, an eye-glass rim; a plunger secured to the movable die and extending through the handle on the pan whereby the movable die may be moved relatively to the fixed die to alter the size of an eye-glass rim on the dies and rendered plastic by the application of heat to the pan; and means operatively connected to the hollow handle of the pan and to the plunger to normally retain the matching relation of the dies.

In witness whereof I hereunto set my signature.

CLARENCE A. KLINE.